Dec. 24, 1968    D. O. RETKE    3,417,421
WINDSHIELD WIPER ATTACHMENT
Filed March 20, 1967

Dale O. Retke
INVENTOR.

BY *Clarence A. O'Brien*
and *Harvey B. Jacobson*
Attorneys

United States Patent Office 3,417,421
Patented Dec. 24, 1968

3,417,421
WINDSHIELD WIPER ATTACHMENT
Dale O. Retke, P.O. Box 306,
Kimball, Nebr. 69145
Filed Mar. 20, 1967, Ser. No. 624,263
5 Claims. (Cl. 15—250.41)

ABSTRACT OF THE DISCLOSURE

An elongated scraping blade assembly including oppositely laterally outwardly directed scraping edge portions and adapted to be supported from a conventional windshield wiper blade and to be utilized primarily on a vehicle driving through a snowstorm for the purpose of preventing freezing snow from icing on the windshield of the vehicle in the area of the windshield normally swept by the associated windshield wiper assembly.

---

This invention relates to a novel and useful windshield wiper attachment and specifically to an attachment adapted for ready removable support from an associated vehicle windshield wiper blade and to be utilized to prevent freezing snow from icing the area of the windshield of the vehicle usually swept by the vehicle's windshield wiper assembly.

The attachment of the instant invention includes an elongated body including upwardly convergent longitudinal sides and a concave surface extending between the divergent ends of the sides adapted to oppose the outer surface of an associated windshield so as to scrape the windshield clean of ice tending to accumulate thereon during lateral movement of the attachment across the outer surface of the windshield. The attachment includes an upwardly opening elongated channel generally paralleling and disposed between the upper convergent ends of the side walls or surfaces of the attachment and in which an associated windshield wiper blade is adapted to be received. In this manner, the attachment may be readily operatively mounted from an associated windshield wiper arm by means of the conventional blade carried by the wiper arm. Of course, although not necessary, the attachment of the instant invention also includes means for engagement with the arm from which the associated wiper blade is supported whereby accidental disengagement of the attachment from the associated blade will be unlikely.

The main object of this invention is to provide a windshield wiper attachment which will be capable of effectively sweeping freezing snow and ice tending to accumulate from an associated vehicle windshield in the areas thereof normally swept by the vehicle's windshield wiper assembly.

A further and very important object of this invention is to provide a wiper attachment which will be capable of removing frost and/or snow that may accumulate on an associated vehicle windshield during periods of non-use of the vehicle.

Another object of this invention is to provide an attachment in accordance with the immediately preceding object and constructed in a manner whereby it will be readily adaptable to securement to substantially all types of windshield wiper blades and arms.

Yet another object of this invention is to provide an attachment which may be readily attached to existing wiper blades and arms with little dexterity being required on the part of the person wishing to attach the attachment to a wiper blade.

A still further object of this invention is to provide a windshield wiper attachment in accordance with the preceding objects and which is constructed in a manner so as to readily flex and thus conform to present day curved windshields.

A final object of this invention to be specifically enumerated herein is to provide a windshield wiper attachment which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
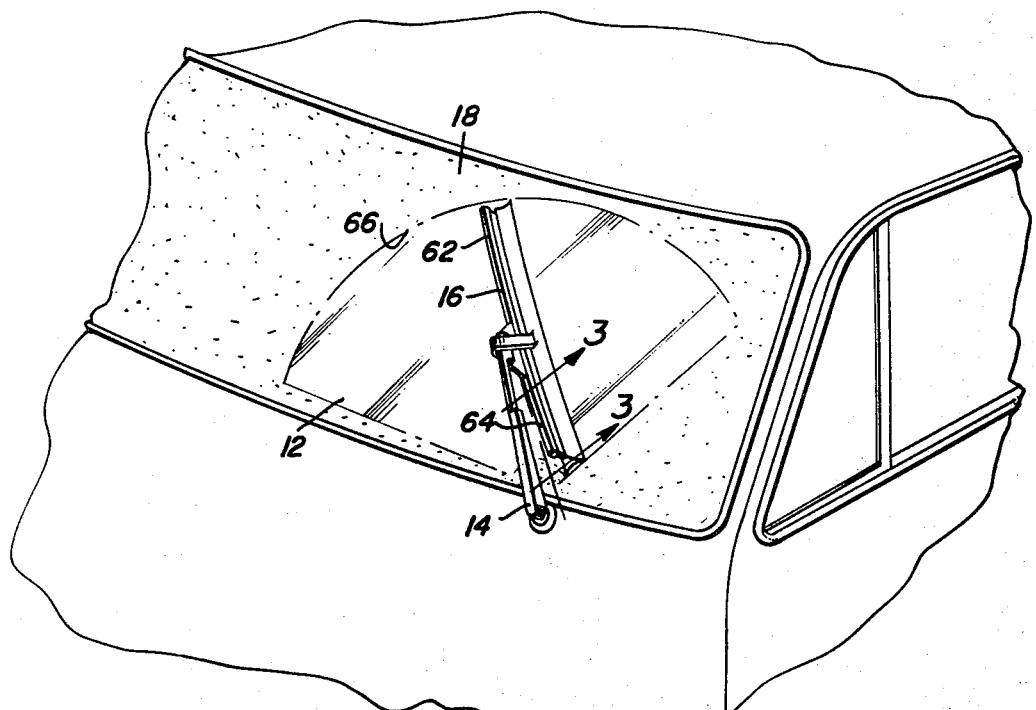
FIGURE 1 is a fragmentary perspective view of a conventional form of motor vehicle illustrating the manner in which the windshield wiper attachment of the instant invention may be operatively associated with a wiper arm and blade assembly of the vehicle.
Figure 2:
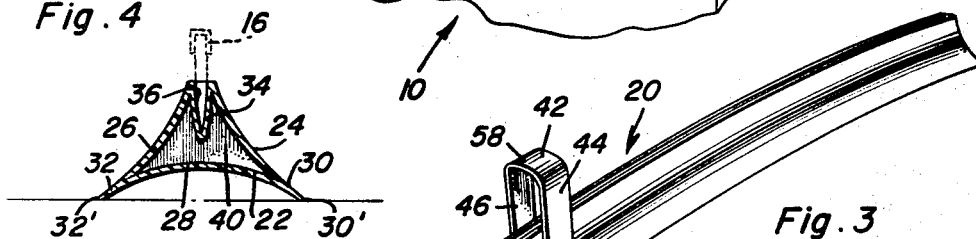
FIGURE 2 is an enlarged perspective view of the attachment of the instant invention.
Figure 4:
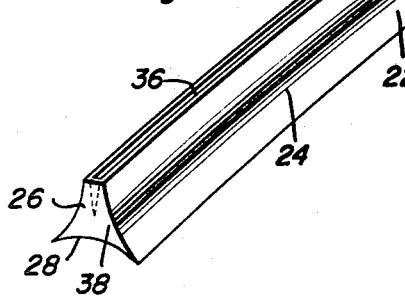
FIGURE 4 is a sectional view taken substantially upon the plane indicated by the section line 4—4 of FIGURE 3.
Figure 3:
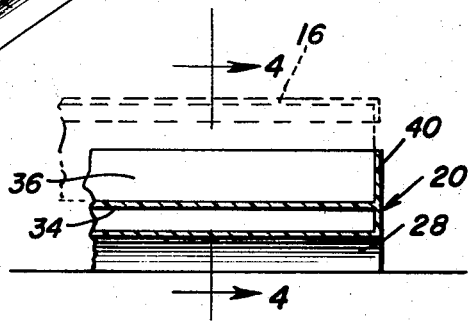
FIGURE 3 is an enlarged fragmentary sectional view taken substantially upon the plane indicated by the section line 3—3 of FIGURE 1.

Referring now more specifically to the drawings the numeral 10 generally designates a conventional form of motor vehicle including a windshield 12 with which an oscillatable windshield wiper arm 14 carrying a wiper blade 16 is operatively associated. The windshield 12 has been illustrated as having disposed on its outer surface a layer of freezing snow 18 and the attachment of the instant invention is generally referred to by the reference numeral 20.

The attachment 20 includes an elongated body 22 including longitudinally extending opposite side walls 24 and 26 which are slightly concaved and are upwardly convergent. A concave bottom wall 28 extends between the lower divergent ends of the side walls 24 and 26 and the apices 30 and 32 extending along opposite side portions of the lower end of the body 22 define outwardly and downwardly facing scraping edges 30' and 32'. The upper ends of the side walls 24 and 26 are interconnected by means of a longitudinally extending trough-like top wall 34 defining an upwardly opening and longitudinally extending recess 36 extending along the upper portion of the body 22. Further, the opposite ends of the body 22 include end walls 38 and 40 closing the ends of the recess 36.

The body 22 further includes a generally inverted U-shaped bail 42 centrally intermediate its opposite ends including a pair of generally parallel legs 44 and 46 interconnected at their upper ends by means of a transversely extending arcuate bight portion 58 and connected to the side walls 24 and 26, respectively, at their lower ends. The lower ends of the legs, depending upon the material from which the body 22 is constructed, may be formed as integral portions of the body 22. Of course, it is to be understood that the body 22 is constructed of somewhat flexible but at least semi-stiff material and material which has resilient properties. In addition, the material from which the body 22 is constructed should be sufficiently soft so as to not scratch the windshield 12 but have sufficient rigidity, while being also flexible and resilient, so as to be adapted to scrape freezing rain and/or snow from the windshield 12. Finally, the body 22 should also be constructed of a material which is non-corrosive in nature due to the severe humidity conditions under which it must be operative, it being contemplated that plastic would serve as a suitable material from which the body 22 could be constructed.

In operation, the body 22 may be removably secured to the blade 16 and arm 14 by first inserting the end portion 62 of the blade 16 in the corresponding end of the recess 36 adjacent but spaced from the end wall 40. In this position of the body 22, the bight portion 42 will be disposed outwardly of the free end of the arm 14. Thereafter, the body 22 may be shifted toward the end portion 64 of the blade 16 whereupon the bight portion 42 will be slipped over the free end of the arm 14 and the end portion 64 of the blade 16 may be subsequently seated in the corresponding end of the recess 36 adjacent the end wall 38. In this manner, the attachment 20 may be readily removably secured to the blade 16 with relative longitudinal movement between the blade 16 and the attachment 20 being prevented by the end walls 38 and 40.

In operation, the attachment 20, when secured to the blade 16, is oscillated with the free end of the wiper arm 14 and thus the scraping edges 30' and 32' are alternately advanced over the area 66 of the windshield 12 with the scraping edges 30' and 32' thus serving to scrape off any freezing snow or rain attempting to form in the area 66.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An attachment for a vehicle windshield wiper assembly of the type including an oscillatable wiper arm having an elongated wiper blade mounted on its free end, said attachment comprising an elongated body including opposite side laterally outwardly and downwardly facing longitudinal scraping edges, said body including means adapted to secure said body to said blade for oscillation therewith with said body extending generally longitudinally of said blade and with said blade disposed above a plane containing said scraping edges, said means adapted to secure said body to said blade including an elongated longitudinally extending and upwardly opening recess defined by said body in which the lower edge of said blade is adapted to be seatingly received, said body including means defining end walls for said recess adapted to oppose the opposite ends of the portions of said blade seated in said recess.

2. The combination of claim 1 wherein said body is constructed of stiff but somewhat flexible and resilient material.

3. The combination of claim 1 wherein said means adapted to secure said body to said blade is adapted to maintain said body beneath said blade and includes an upwardly projecting element carried by said body centrally intermediate its opposite ends and defining a socket extending longitudinally of said body adapted to telescopingly receive the free end of said arm therein.

4. The combination of claim 3 wherein said upwardly projecting element includes a generally inverted U-shaped member including a pair of upstanding leg portions interconnected at their upper ends by means of a bight portion extending therebetween and secured to said opposite side portions of said body at their lower ends.

5. The combination of claim 4 wherein said body includes means defining end walls for said recess adapted to oppose the opposite ends of the portions of said blade seated in said recess.

References Cited
UNITED STATES PATENTS

| | | | |
|---|---|---|---|
| 1,650,542 | 11/1927 | Schroyer, et al. | 15—250.41 |
| 1,749,049 | 3/1930 | Turner | 15—250.4 XR |
| 1,846,885 | 2/1932 | Manuel | 15—250.41 XR |

PETER FELDMAN, *Primary Examiner.*

U.S. Cl. X.R.

15—105